United States Patent
Olsen

(10) Patent No.: US 7,174,073 B1
(45) Date of Patent: Feb. 6, 2007

(54) MULTIPLE-TAPPED OPTICAL DELAY LINE

(75) Inventor: Randall B. Olsen, Carlsbad, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 8 days.

(21) Appl. No.: 10/919,054

(22) Filed: Aug. 16, 2004

(51) Int. Cl.
*G02B 6/26* (2006.01)

(52) U.S. Cl. .................. 385/48; 385/27; 385/123; 385/129

(58) Field of Classification Search ............... 385/15, 385/27, 48, 123, 129
See application file for complete search history.

(56) References Cited

U.S. PATENT DOCUMENTS

| | | | |
|---|---|---|---|
| 4,068,952 A * | 1/1978 | Erbert et al. ............... 356/4.02 |
| 5,002,350 A | 3/1991 | Dragone | |
| 5,113,458 A | 5/1992 | Taylor | |
| 6,608,721 B1 | 8/2003 | Turpin et al. | |
| 6,744,950 B2 * | 6/2004 | Aleksoff ..................... 385/48 |
| 2002/0146206 A1 * | 10/2002 | Aleksoff ..................... 385/48 |

* cited by examiner

*Primary Examiner*—Frank G. Font
*Assistant Examiner*—Michael P. Mooney
(74) *Attorney, Agent, or Firm*—Peter A. Lipovsky; Michael A. Kagan; Allan Y. Lee

(57) ABSTRACT

Photonic signals of high bandwidth are input into a winding of optical fiber. The winding of fiber has winds of fiber that are adjacently disposed and that form a substantially linear outer surface of the winding. A series of optical taps are defined in the optical fiber along this surface. The fiber includes an inner core surrounded by an outer layer. The taps comprise a diminished outer layer section of the fiber. It is from these taps that optical energy is released from the fiber.

5 Claims, 3 Drawing Sheets

MULTIPLE-TAPPED OPTICAL DELAY LINE

BACKGROUND

One use of a conventional optical delay line is to separate the particular colors of a chromatic spectrum. An array waveguide grating (AWG) can be useful for this purpose. To use such a grating for extremely high color resolution, the physical size of the AWG must be quite large. Such a size could easily exceed the size of a common silicon wafer. There is thus a need for an optical delay line that provides high color resolution but that is also compact. Such an optical delay line can enable a very high resolution AWG system (a hyper-resolution AWG).

SUMMARY

Photonic signals of high bandwidth are input into a winding of optical fiber. The winding of fiber has individual winds of fiber that are adjacently disposed and that form a substantially linear outer surface of the winding. A series of optical taps are defined in the optical fiber along this surface. The fiber includes an inner core surrounded by an outer layer. The taps comprise a diminished outer layer section of the fiber. It is from these taps that optical energy is released from the fiber.

Other objects, advantages and new features will become apparent from the following detailed description when considered in conjunction with the accompanying drawings.

BRIEF DESCRIPTION OF THE DRAWINGS

FIGS. 2A and 2B show cross sections of optical fiber as may be used according to the description herein, wherein FIG. 2A shows an unaltered fiber and FIG. 2B shows a fiber altered according to the description herein.

DESCRIPTION

Figure 1:
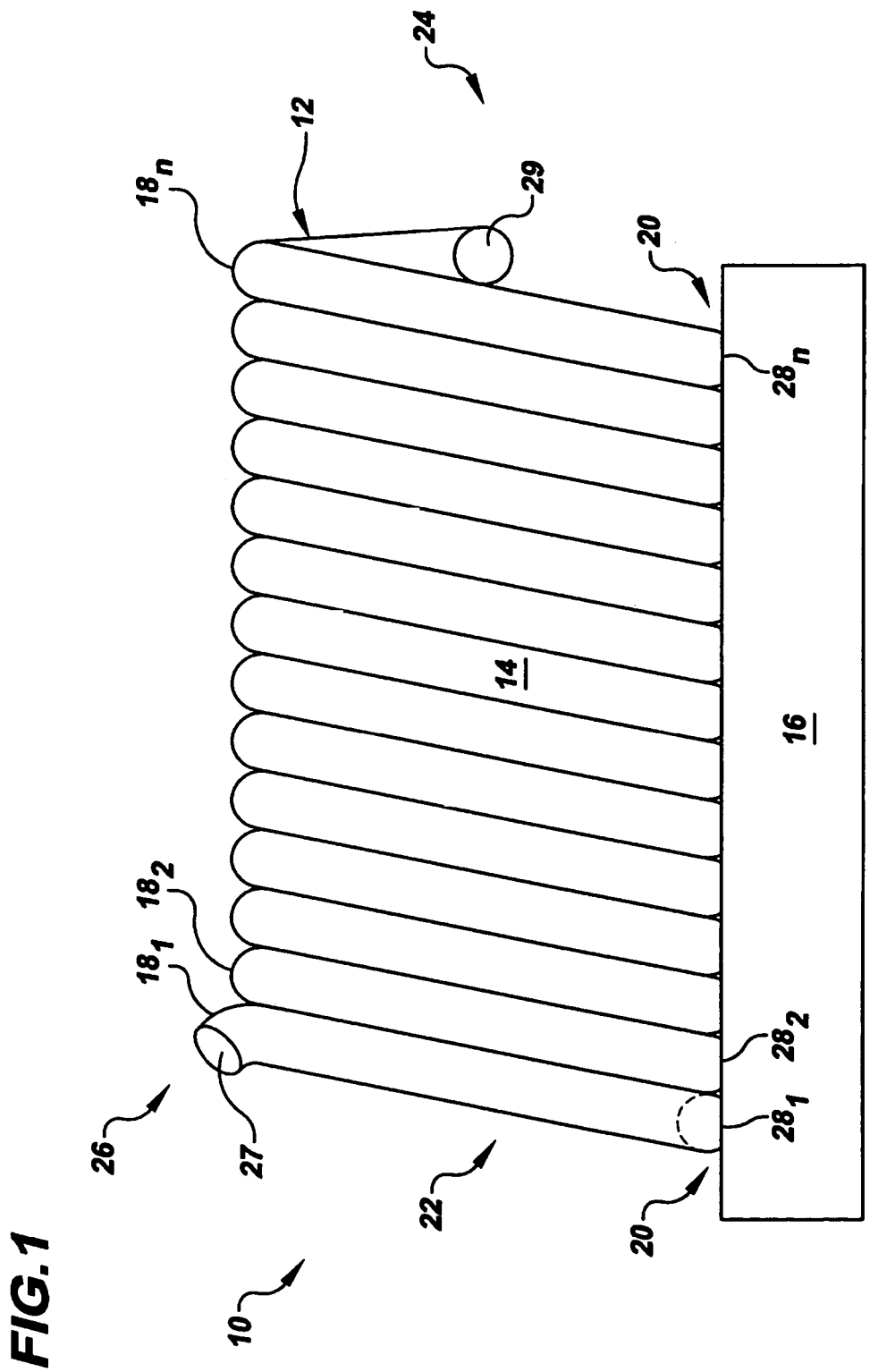
FIG. 1 illustrates a side view of a multiple-tapped optical delay line according to the description herein.

Referring now to FIG. 1, a representative delay line 10 is shown. System 10 includes a winding 12 of optical fiber 14 that, for example, may be wound around an optionally removable mandrel, not shown. Once so wound, the winding can be held in place by adhesive, for example. Also shown in FIG. 1 is a planar waveguide 16 upon which winding 12 rests.

A specific construction of system 10, offered by way of example, has contiguous winds 18 of fiber that, in this example, are disposed immediately adjacent each other to form at least at 20 a substantially linear surface of winding 12. Surface 20 runs from one end 22 of winding 12 to its other end 24, and is brought into contact with planar waveguide 16 upon which winding 12 rests.

Broadband optical energy 26 is received at an input 27 to fiber winding 12 and is released through a series of optical taps 28 that are defined in fiber winds 18 along surface 20 (to be described herein further). End 29 of fiber 14 can be a fiber termination such as a matched load providing minimal reflection. It should be noted that the number of winds of optical fiber shown in FIG. 1 is for illustration purposes. While winding numbers of least of order 10 are suitable for many purposes, winds of order 100 will provide greater frequency resolution fidelity. The minimum curvature of the winds will be dictated by the bending limits suggested by the fiber manufacturer.

In an understood manner, the length by which optical signals travel in a waveguide affects the phase of the traveling light and hence provides a mechanism by which the colors of the incoming light can be separated. In essence, different waveguide phase lengths permit different frequencies of light to be segregated from other frequencies of light. It is thereby possible to spread the colors of light out by creating a phase length difference that corresponds to a particular desired travel time of the light, wherein 1 divided by this desired travel time creates the approximate upper limit to the frequency resolution of a hyper-resolution AWG.

For example, to create a frequency resolution of approximately 100 MHz (0.1 GHz), a path length (in a vacuum) of approximately 10 feet of travel or 10 nanoseconds of light travel time is required. Because the index of refraction of glass (fiber) differs from that of a vacuum, a shorter length of fiber is suitable to accomplish this delay. In this instance, approximately six feet of fiber, between the first and last optical taps 28 (tap $28_1$ and tap $28_n$ of FIG. 1) provide a 0.1 GHz resolution. To create a 1 GHz frequency resolution, approximately 0.6 feet of optical fiber between the first and last optical taps is needed. To create a 10 GHz frequency resolution, approximately 0.06 feet of optical fiber between the first and last optical taps is needed. Higher resolution can be achieved by lengthening the distance between these first and last optical taps.

Figure 2A:
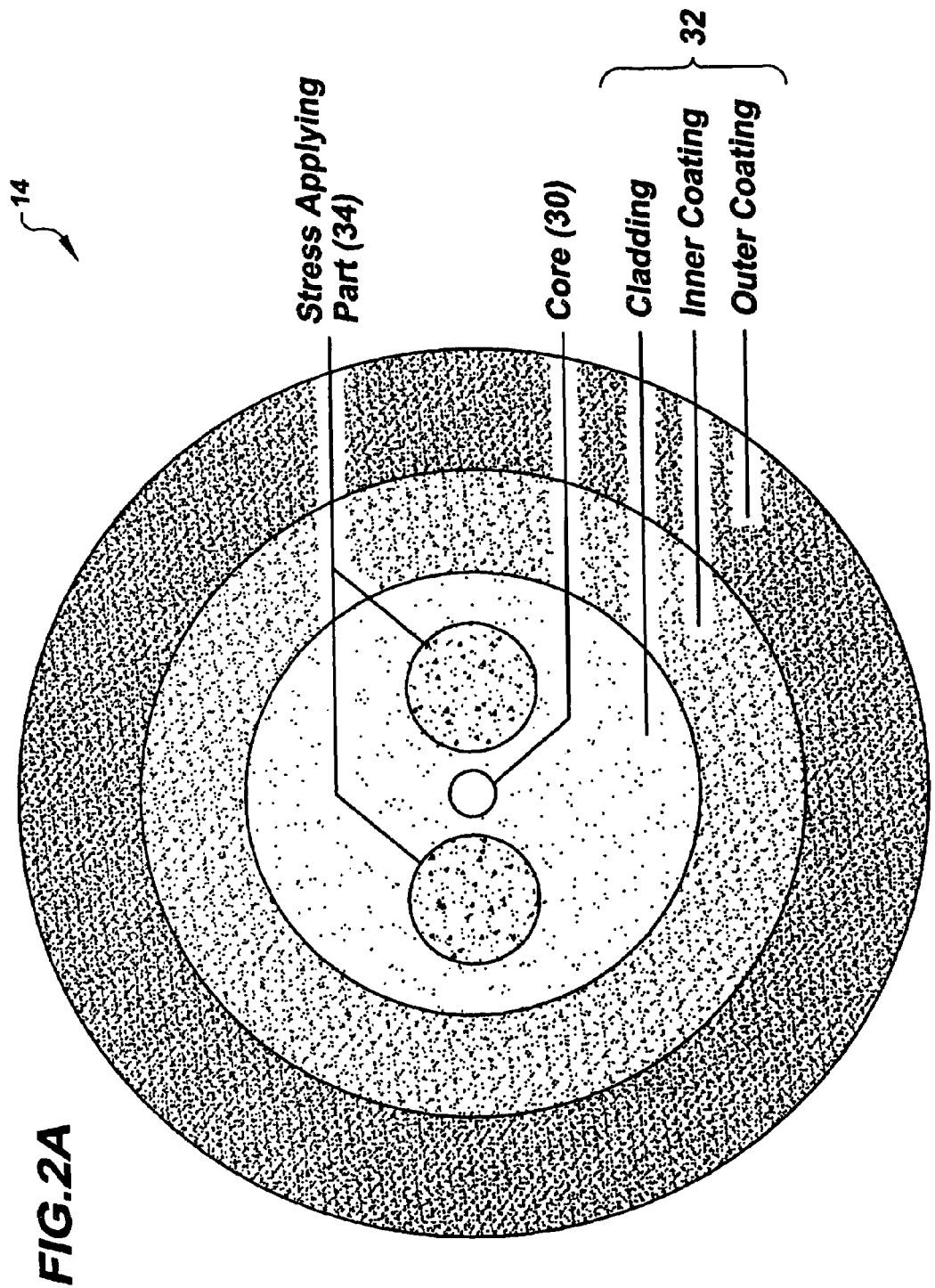
Figure 2B:
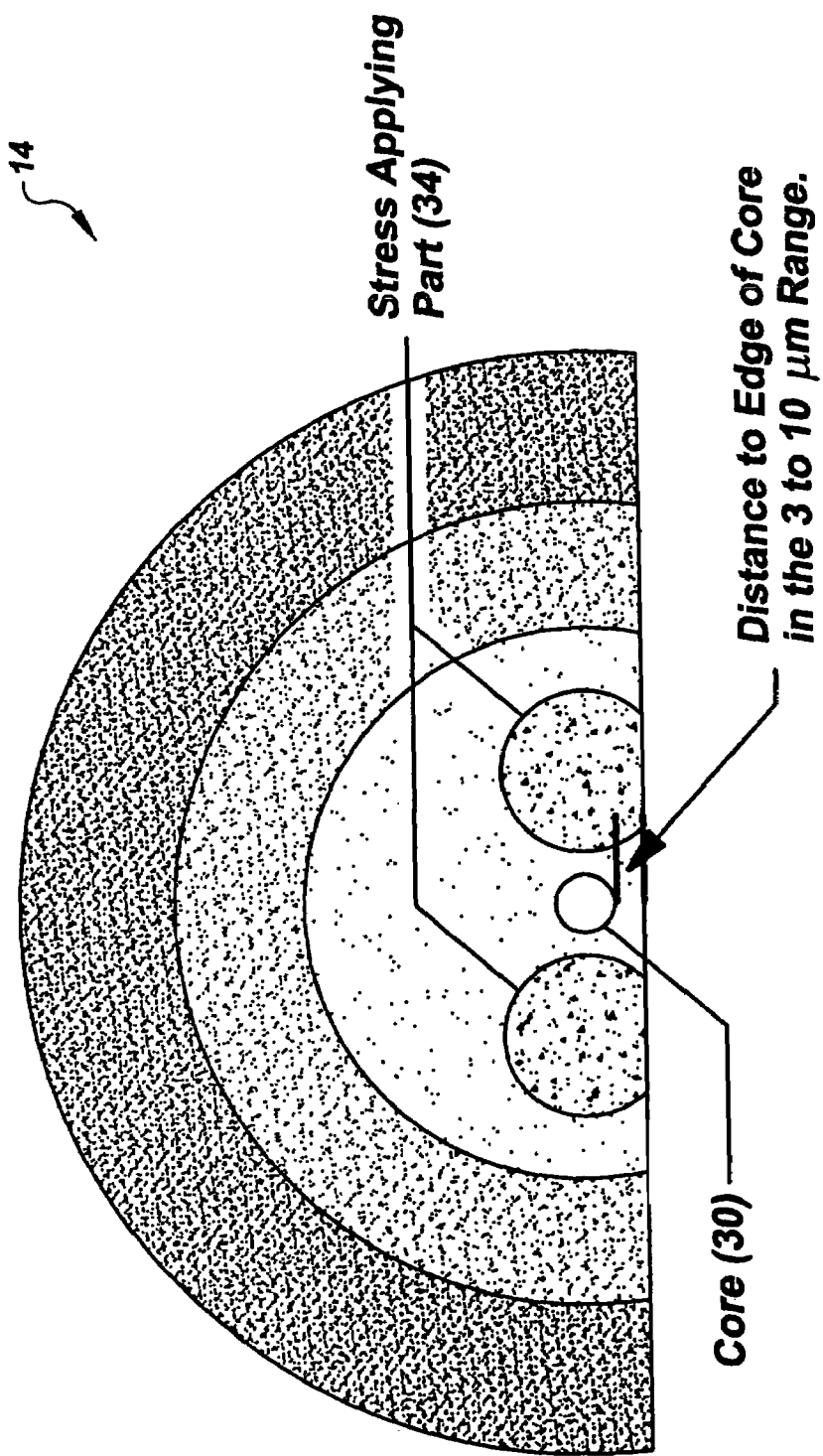

Taps 28 are designed to allow light to radiate from winding 12. Referring now to FIGS. 2A and 2B, there is shown in FIG. 2A an example fiber that is suitable for the purpose of carrying light and radiating it at taps in accordance to this description. Particularly, a polarization maintaining fiber is considered well suited for this purpose as the single polarization characteristic of such a fiber minimizes cross-polarization phenomena.

An example of such a polarization maintaining fiber is known as Corning® PM Specialty Fiber. The version identified as PM 1550 is suitable for a 1550 nm (light wavelength in vacuum) delay line. Version PM 980 is suitable for a 980 nm optical delay line.

FIG. 2A, an "untapped" cross-section of fiber 14 is shown with an inner core 30 surrounded by an outer layer 32 collectively shown as cladding, inner coating and outer coating. The Corning® polarization maintaining fiber cited above as an example fiber utilizes stress elements 34 to maintain tension on core 30.

Referring now to FIG. 2B, there is shown a cross-section of a "polished" fiber optic cable 14 having a diminished outer layer. The section of fiber 14 wherein this diminished outer layer exists serves as optical tap 28, see FIG. 1 wherein this tap is shown. All taps are similarly oriented.

The removal of some of outer layer 32 may be performed by polishing on a standard bulk optic polishing plate. This task can be performed once fiber 14 is wound upon a mandrel wherein each winds $18_1-18_n$ is simultaneously polished along surface 20 of winding 12. As described in FIG. 2B, an example "depth" of polishing is to within 3 to 10 micrometers of core 30. Such polishing results in a tapping of approximately 1% of the optical energy provided through core 30 out of each of the taps 28.

Referring again to FIG. 1, the energy radiated from taps 28 can be collected in planar waveguide 16 that can be glued or epoxied, for example, in place along surface 20 of winding 12. A suitable overlap of each tap with the waveguide is approximately a millimeter. An example suitable contact is for each wind 18 to run approximately 1 mm along waveguide 16 (this contact running substantially into the page of FIG. 1). This junction permits the optical energy emitted by taps 28 to be operably coupled to the waveguide.

Obviously, many modifications and variations are possible in light of the above description. It is therefore to be understood that within the scope of the claims the invention may be practiced otherwise than as has been specifically described.

What is claimed is:

1. An optical delay line comprising:
    a cylindrical winding of polarization maintaining optical fiber having winds of said fiber that are immediately adjacently disposed and that form a substantially linear outer surface of said winding, said optical fiber having an input end wherein optical energy is received;
    a series of optical taps defined in said optical fiber wherein optical energy is released, said optical taps being disposed along said substantially linear surface of said winding wherein said optical fiber includes an inner core surrounded by an outer layer and said optical taps each comprise a diminished outer layer section of said optical fiber; and
    a planar waveguide, said planar waveguide operably coupled to said winding so that said optical taps of said winding provide optical energy released therefrom to said planar waveguide.

2. The optical delay line of claim 1 having said winding at least 0.06 feet long between first and last of said optical taps and having a frequency resolution of at least 10 G Hz.

3. The optical delay line of claim 1 having said winding at least 0.6 feet long between first and last of said optical taps and having a frequency resolution of at least 1 G Hz.

4. The optical delay line of claim 1 having said winding at least 6 feet long between first and last of said optical taps and having a frequency resolution of at least 0.1 G Hz.

5. The optical delay line of claim 1 wherein said received optical energy falls within a frequency bandwidth that is between 1 G Hz and 100 G Hz.

* * * * *